Patented Aug. 30, 1932

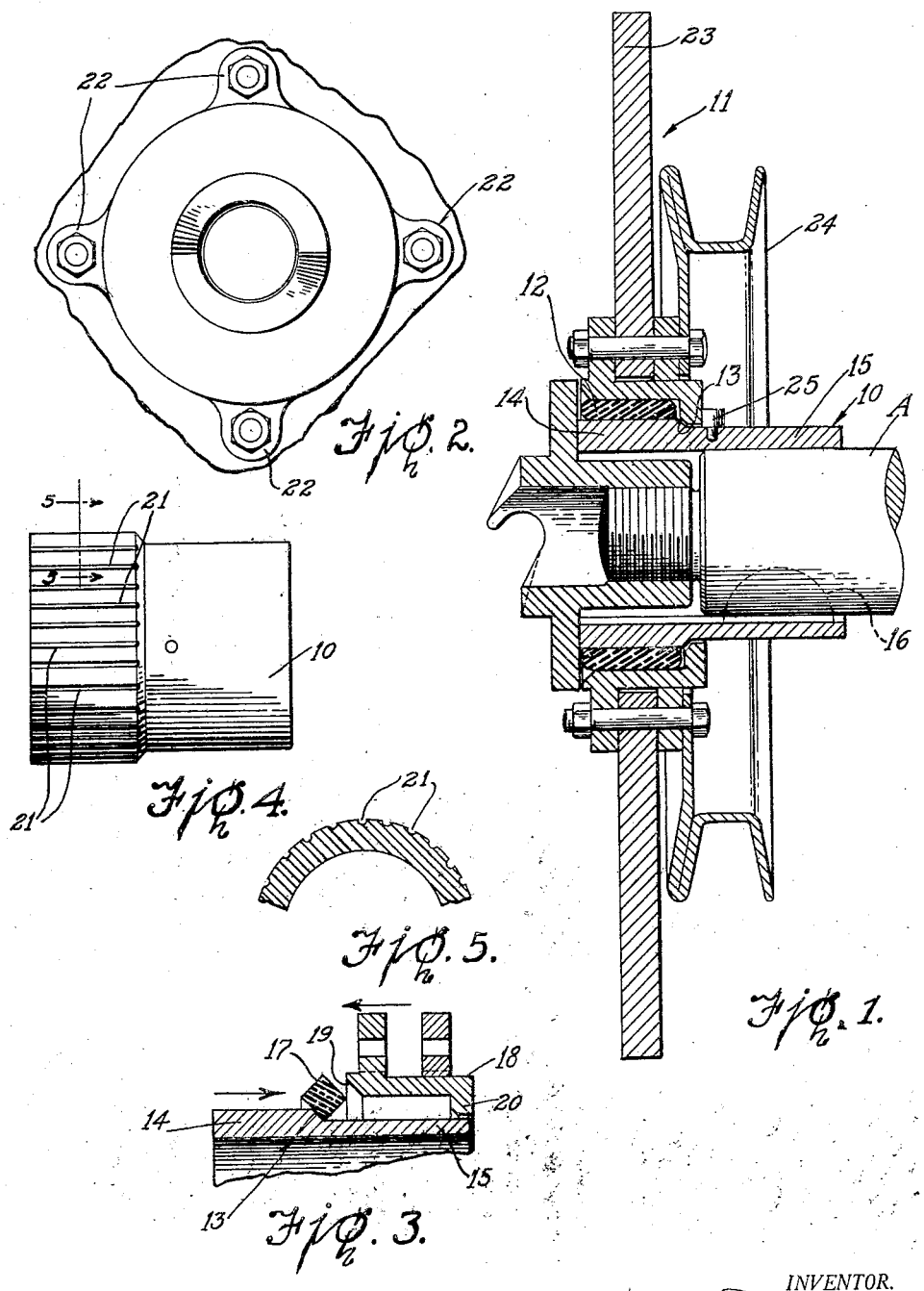

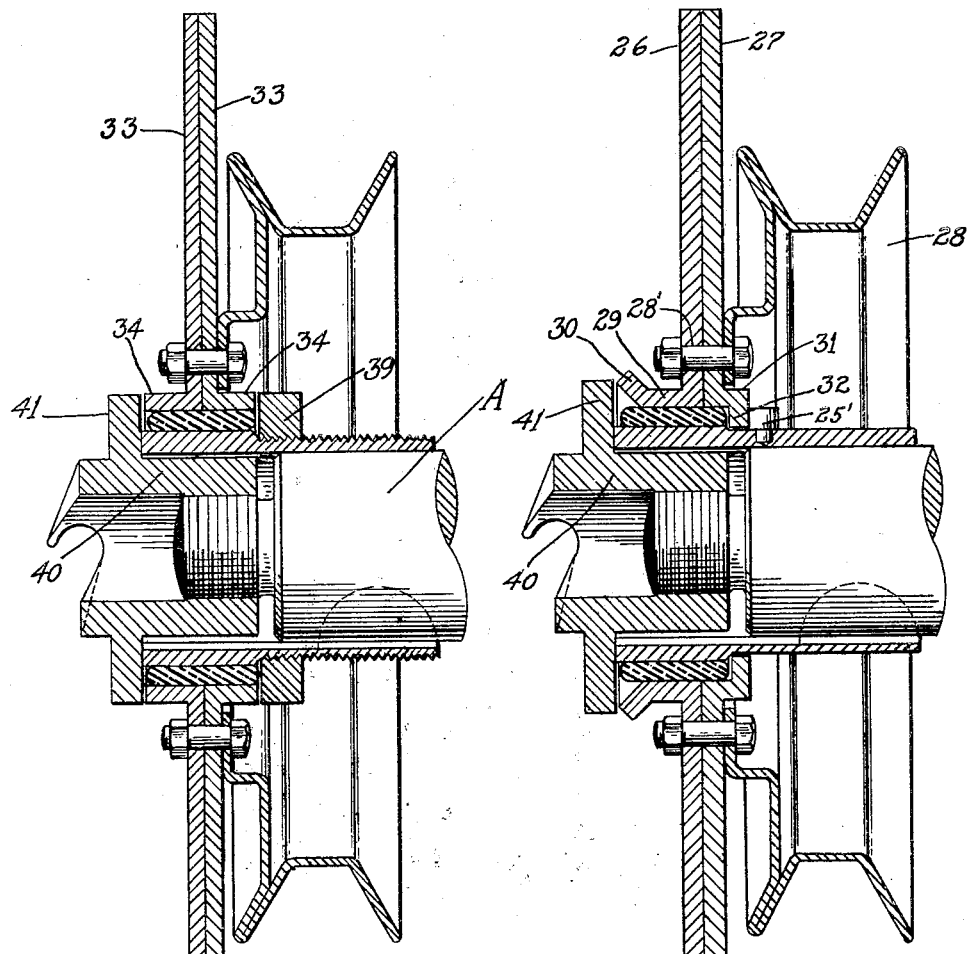
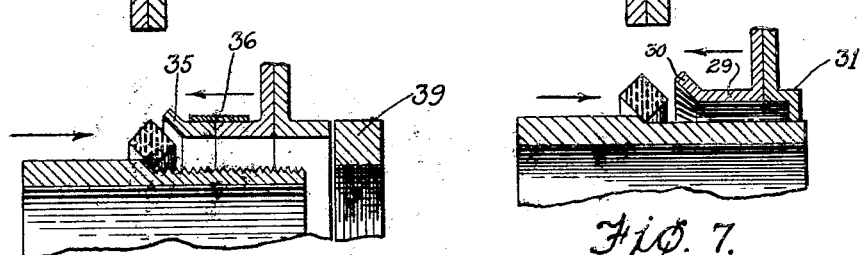
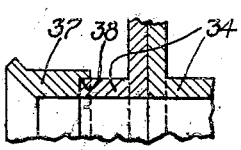

1,874,515

UNITED STATES PATENT OFFICE

WILLIAM W. HARRIS, OF DETROIT, MICHIGAN, ASSIGNOR TO CONTINENTAL MOTORS CORPORATION, OF DETROIT, MICHIGAN, A CORPORATION OF VIRGINIA

VIBRATION DAMPER

Application filed April 11, 1930. Serial No. 443,566.

This invention relates to internal combustion engines and more particularly to vibration dampers adapted for assembly with the forward end of an engine crankshaft to dampen out torsional vibrations.

Vibration dampers of the friction type, which have been used to a great extent during the past few years are objectionable because of the excessive wear to which the frictional material is subjected, and consequently the dampers do not always function as efficiently as they should.

It is the object of my invention to provide a vibration damper for engine crankshafts in which wear is reduced to a minimum by providing a yieldable connection between the driving hub and flywheel structure in which external friction between the cooperating parts of the damper has been eliminated.

Another object of my invention is to provide a vibration damper of the non-friction type in which a yieldable member is interposed between the driving hub and flywheel structure and arranged to lie under a state of compression to facilitate the connection therebetween.

A further object of my invention is to facilitate the union between a yieldable member a driving hub and a flywheel structure by providing an intermediate cementing compound which when subjected to pressure and allowed to set will cause said parts to firmly adhere together.

A still further object of my invention is to provide a vibration damper structure for engine crankshafts of economical manufacture by constructing the same of parts which can be very economically manufactured and which may be very readily and economically assembled together and to the forward end of the crankshaft.

A still further object of my invention is to facilitate the manufacture of a vibration damper of the non-friction type for engine crankshafts by providing a new method or process of manufacture in which a yieldable and deformable connecting member may be readily assembled intermediate the driving hub and flywheel structure and to lie in a state of compression in assembly.

For a more detailed understanding of my invention, reference may be had to the accompanying drawings which illustrate one form which my invention may assume, and in which:

Fig. 1 is a longitudinal sectional view of an engine crankshaft vibration damper constructed in accordance with my invention, Fig. 2 is a fragmentary front elevation of the vibration damper shown in Fig. 1, Fig. 3 is a detail view thereof illustrating the method of assembly, Fig. 4 is a detail side elevational view of a modified form of driving hub, Fig. 5 is a transverse sectional view taken on the line 5—5 of Fig. 4, Fig. 6 is a longitudinal sectional view of a modified form of damper construction, Fig. 7 is a detail view illustrating the method of assembly of the modified structure shown in Fig. 6, Fig. 8 is a longitudinal sectional view of a further modified form of damper construction, Fig. 9 is a detail view illustrating the method of assembly of the modified structure shown in Fig. 8, and Fig. 10 is detail sectional view showing a modified form of nose construction for use in assembling a damper structure as shown in Fig. 8.

A designates the usual crankshaft of an internal combustion engine, the forward end of said crankshaft being adapted to have a vibration damper secured thereto to dampen out the torsional vibrations generated in the engine crankshaft, which has now become of extreme importance since the event of the six and eight cylinder engines.

The vibration damper comprises in general a driving hub 10, a flywheel structure 11 and a member 12 for yieldingly connecting the driving hub with the flywheel structure. The driving hub 10 is preferably provided with a beveled shoulder 13 midway of the ends thereof which divides the hub into an enlarged portion 14 and a portion 15 of relatively less diameter. The hub is fixed to the crankshaft preferably by means of key 16. Prior to assembly with the crankshaft the vibration damper parts are secured together, Fig. 3 illustrating the method of assembly. A deformable ring 17 of rubber or other like material is slipped over the reduced portion 15 of the hub, the ring being constructed substantially square in cross section. Another ring like structure 18 is slipped on the hub after the rubber ring, and is provided with a beveled nose 19 at the forward end and with an inwardly extending flange 20 at the rear end. It will be noted that the deformable ring 17 rests against the beveled shoulder 13 carried by the driving hub. Pressure is applied against the rear face of the ring structure 18 forcing the same against the deformable ring 17 and squeezing or flattening the same into the shape shown in Fig. 1. It will thus be seen that I have provided a structure in which the yieldable member, that connects the hub and flywheel structure, lies in a state of compression in assembly. The yieldable deformed member thus exerts a force against the hub and flywheel structure thereby assisting the gripping action of the rubber to prevent the flywheel and hub slipping.

In order to provide means for positively preventing such slippage the driving hub 10 may be provided with serrations 21 in which the rubber is pressed, thereby keying the yieldable connecting member to the driving hub.

Further means may be provided for more firmly uniting the compressed rubber ring to the flywheel and hub by applying a coating or film of grease, such as vaseline to the metal hub or flywheel or both. When this is allowed to set under pressure the rubber ring will firmly adhere to the metal surface, the vaseline serving as an adhesive element. The ring like structure 18 is preferably provided with a plurality of outwardly extending lugs 22 and a flywheel structure comprising the disc 23 is bolted or otherwise secured to these lugs. Preferably the same bolts utilized for securing the flywheel disc 23 to the fixture are employed to fasten a sheet metal pulley structure 24 thereto. When the flywheel has been assembled to the disc, a pin or dowel 25 is secured to the hub to the rear of the fixture 18 to prevent retraction of the fixture from the hub.

Figures 6 and 7 illustrate a modified structure in which the flywheel structure is constructed of two discs 26 and 27 secured together back to back and a sheet metal pulley structure 28. Bolts 28' secure the two discs and pulley together. The disc 26 is provided with a flange 29 that is outwardly flared as at 30, thus presenting a beveled nose for engagement with the deformable rubber ring on assembly for flattening or squeezing the rubber between the hub and the flywheel structure. The disc 27 is preferably formed with an angularly shaped flange 31, the inwardly extending portion 32 being constructed to engage the rear edge of the deformed rubber ring. The driving hub in Figs. 6 and 7 is constructed substantially the same as the driving hub shown in Figs. 1 and 3, and a pin or dowel 25' is secured to the hub to retain the flywheel assembly in place.

A further modified structure is illustrated in Figs. 8 and 9. This construction shows flywheel disc members 33 of like construction which are each provided with a flange 34 adapted to be engaged by the deformed yieldable connecting member as is the case with the above described structures. In this particular case the beveled nose is omitted, but a temporary nose member 35 is detachably secured to the front disc 33 by means of a split spring circlip 36 as shown in Fig. 9 or by providing a nose member 37 (see Fig. 10) having a seat 38 in which the annular flange 34 of the front disc is seated. The method of assembly is the same as with the above described structures, but when the flywheel structure has been assembled to the hub the detachable nose member 35 is removed, and a nut 39 is screwed on the externally threaded rear portion of the hub to retain the flywheel assembly in place.

All of these structures illustrated in Figs. 1, 6 and 8 are retained to the crankshaft by means of the starter element 40, which is secured in any suitable manner to the engine crankshaft, the starter element in each case being provided with a flange 41 adapted to engage the front end of the driving hub and flywheel structure.

It may be noted that all the structures illustrated in the drawings and described in the preceding paragraphs include a yieldable member, preferably constructed of rubber or the like, which has a relatively high coefficient of friction and which is held under compression in the assembly. This yieldable member will firmly grip the metallic surfaces of the adjoining damper parts such as the flywheel structure and the driving hub and is prevented from slipping because of the high coefficient of friction between the yielding member and the contacting metallic surface. The rubber connecting member will yield internally to dampen out the torsional vibrations. The vaseline may be employed to make the yieldable member more firmly adhere to the adjoining damper parts without slipping. Thus my improved construction eliminates the maximum of wear thereby insuring a long life to the damper, and insuring a substantially constant resistance to the torsional vibrations in the crankshaft.

Although I have illustrated but one form of my invention and have described in detail but a single application thereof, it will be apparent to those skilled in the art to which my invention pertains that various modifications and changes may be made therein without departing from the spirit of my invention or from the scope of the appended claim.

What I claim as my invention is:

A vibration damper for engine crankshafts comprising a driving hub fixed to the crankshaft, a flywheel structure constructed of a pair of complementary disc members secured together back to back and each provided with a central opening through which the driving hub is extended, said discs each having oppositely projected flange portions about the periphery of the opening, and means intermediate the hub and flywheel structure and engaging the flanged portion of the discs to yieldingly connect the hub and flywheel structure.

In witness whereof, I hereunto subscribe my name this 10th day of April, 1930.

WILLIAM W. HARRIS.